(12) United States Patent
Wakamatsu

(10) Patent No.: US 6,387,165 B1
(45) Date of Patent: May 14, 2002

(54) AIRBORNE MOLECULAR CONTAMINANT REMOVING APPARATUS

(75) Inventor: Hidetoshi Wakamatsu, Tokyo (JP)

(73) Assignee: Oki Electric Industry Co, Ltd., Tokyo (JP)

(*) Notice: Subject to any disclaimer, the term of this patent is extended or adjusted under 35 U.S.C. 154(b) by 20 days.

(21) Appl. No.: 09/612,458

(22) Filed: Jul. 7, 2000

(30) Foreign Application Priority Data

Feb. 25, 2000 (JP) ........................................ 2000-049716

(51) Int. Cl.⁷ .............................................. B01D 47/00
(52) U.S. Cl. .............................. 96/270; 96/297; 96/300; 96/322; 96/355; 96/371
(58) Field of Search ......................... 96/270, 271, 273, 96/297, 300, 322, 355, 386, 358, 361, 362, 363, 364, 365, 371; 95/199, 210, 214, 216, 217, 220, 221, 222, 223, 225

(56) References Cited

U.S. PATENT DOCUMENTS

| | | | | |
|---|---|---|---|---|
| 843,180 A | * | 2/1907 | Rogers | |
| 1,117,309 A | * | 11/1914 | Bentz | |
| 1,222,541 A | * | 4/1917 | Dunham | |
| 2,057,579 A | * | 10/1936 | Kurth | |
| 2,090,287 A | * | 8/1937 | Cornelius | |
| 2,186,125 A | * | 1/1940 | Roberts | |
| 2,802,543 A | * | 8/1957 | Clark | |
| 3,444,670 A | * | 5/1969 | Hungate | |
| 3,691,733 A | * | 9/1972 | Stockford | |
| 3,726,062 A | * | 4/1973 | Hungate et al. | |
| 3,785,127 A | * | 1/1974 | Mare | |
| 3,795,089 A | * | 3/1974 | Reither | |
| 3,861,891 A | * | 1/1975 | Noguchi et al. | |
| 3,925,040 A | * | 12/1975 | Fattinger | |
| 4,053,292 A | * | 10/1977 | Scneider et al. | |
| 4,397,662 A | * | 8/1983 | Bloomer | |
| 4,604,108 A | * | 8/1986 | Cotton, Jr. | |
| 4,684,379 A | * | 8/1987 | Gambrell | |
| 5,890,367 A | | 4/1999 | You et al. | |
| 6,059,866 A | * | 5/2000 | Yamagata et al. | |

FOREIGN PATENT DOCUMENTS

JP 08038844 2/1996
JP 09239224 9/1997

* cited by examiner

*Primary Examiner*—Duane S. Smith
(74) *Attorney, Agent, or Firm*—Rabin & Berdo, P.C.

(57) ABSTRACT

A pair of jet nozzles are constructed for vapor-liquid contact removal in a gaseous molecule impurity removal apparatus, with one of the nozzles producing a counter flow to an upstream direction and the other nozzle producing a flow parallel to a downstream flow, the pair of nozzles being so disposed as to be joined together in a counter flow system. The counter flow nozzles are arranged alternatively so that they are not opposite each other. Also, a three stage eliminator structure is provided, and air that has been processed once is fed back to a central eliminator.

6 Claims, 3 Drawing Sheets

AIRBORNE MOLECULAR CONTAMINANT REMOVING APPARATUS

BACKGROUND OF THE INVENTION

1. Field of the Invention

The present invention relates to purifying apparatus for purifying outside air supplied to facilities with semiconductor equipment installed, and particularly to purifying apparatus applied to removing aerial chemical contaminants such as particulate contaminants or airborne molecular contaminants included in outside air.

2. Description of Related Art

FIG. 1 is an overall view of an air conditioning unit incorporating an eliminating device for eliminating gaseous molecule impurities including aerial chemical contaminants, and particularly small amounts of water soluble gaseous substance impurities. This system is for use as purifying apparatus for purifying exhaust gas from special facilities or cleaning outside air supplied to a clean room.

In FIG. 1, arranged from the top in order, are a pre-filter 1, a medium efficiency filter 2, a heating coil 3, a cooling coil 4, a gaseous molecule impurity remover 5, a fan 8, a heating coil 9, and a humidifier 10. The gaseous molecule impurity remover 5 consists of a nozzle 6, which injects toward an upstream side supplied with pure water from an external pure water manufacturing plant 13 through a purified water tank 11 using a pump 12, and a group of plates 7 having an eliminator structure arranged at a location separated from the nozzle 6.

The gaseous molecule impurity removing principle of this method is a vapor-liquid contact method which removes gaseous molecule impurities by increasing the efficiency of vapor-liquid contact using a water droplet jet from the nozzle 6 and a hydrophilic eliminator. In this way, by supplying liquid into a packing material having high fluid injection and porosity, in other words a large surface area, the vapor-liquid contact system removes gaseous molecule impurities in air with a removal efficiency equal to that of a dry process using chemical filter, pressure adjustment is easy, it is maintenance free and running costs can also be reduced.

However, the removal method of the related art has the following problems. (a) With a jet method using a nozzle, the vapor-liquid contact efficiency declines due to the effects of the flow efficiency of air flowing inside the apparatus on a jet stream. (b) Since the whole surface of hydrophilic eliminator is usually in a wet state, the flow resistance of the eliminator itself increases and it causes a large pressure loss. (c) The wet state of the eliminator surface also makes it impossible to prevent absorbed water drops from scattering to the downstream side because of the wet state. (d) Since a hydrophilic eliminator is formed in a plate configuration combined with an enhanced chemical material, water drops penetrate the hydrophilic eliminator when water soluble gaseous molecule impurities are removed, lowering the removal efficiency. (e) When dissolving of gaseous molecule impurities into water drops reaches a critical state, it causes gaseous molecule impurities to be re-released into the air resulting in a reduction in the maintenance cycle of the eliminator. (f) Directly supplying pure water into an eliminator and removing gaseous molecule impurities results in a lowering of the moisture removal capability of the eliminator itself and thus its capability for preventing water drop particles scattering to the downstream side. (g) With only an eliminator, since the nozzle is made unnecessary and water is supplied directly, it becomes impossible to control lowering of the vapor-liquid contact efficiency and temperature necessary for air conditioning. (h) Because of scattering of water drop particles from the eliminator, fin component parts of a fan at a downstream side are corroded.

SUMMARY OF THE INVENTION

The present invention provides a gaseous molecule impurity removing apparatus for an apparatus for purifying airborne molecular contaminants, having a nozzle section consisted of a group of jet nozzles, with a forward jet nozzle arranged so as to face upstream and a rearward nozzle arranged so as to face downstream. It is also possible for the forward nozzle to face downstream and for the rearward nozzle to face upstream. In an eliminator having a three stage structure, a windmill type fan is built into a central eliminator stage.

As a result a vapor-liquid contact efficiency for the gaseous molecule impurities is increased and a gaseous molecule impurity removal efficiency is improved. Also, it is possible to reduce the space occupied and it is possible to reduce running costs still further.

DETAILED DESCRIPTION OF THE INVENTION (FIRST EMBODIMENT)

Figure 1:
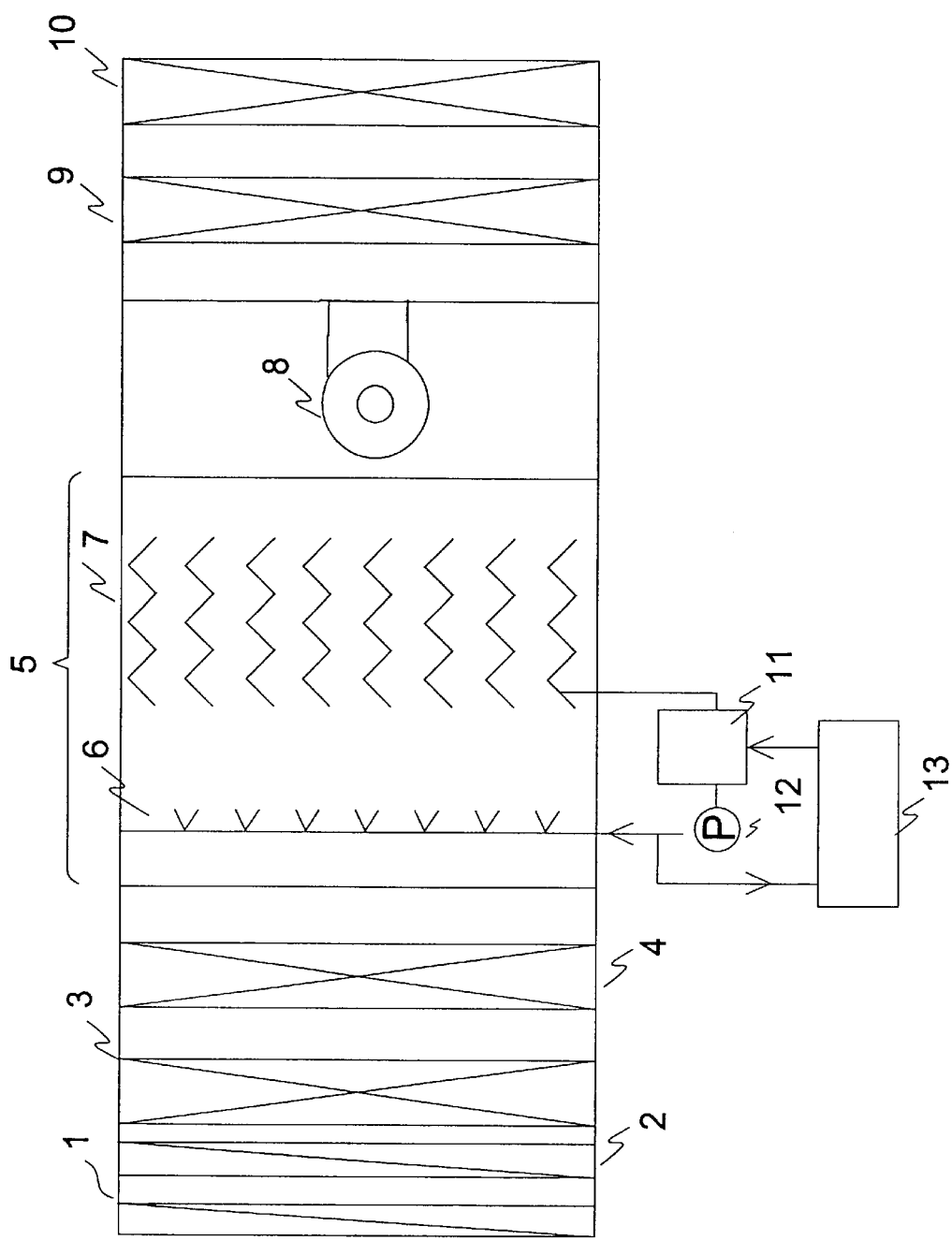
FIG. 1 is an overall view of an air conditioning unit for outside air containing a gaseous molecule impurity removing system of the related art.
Figure 2:
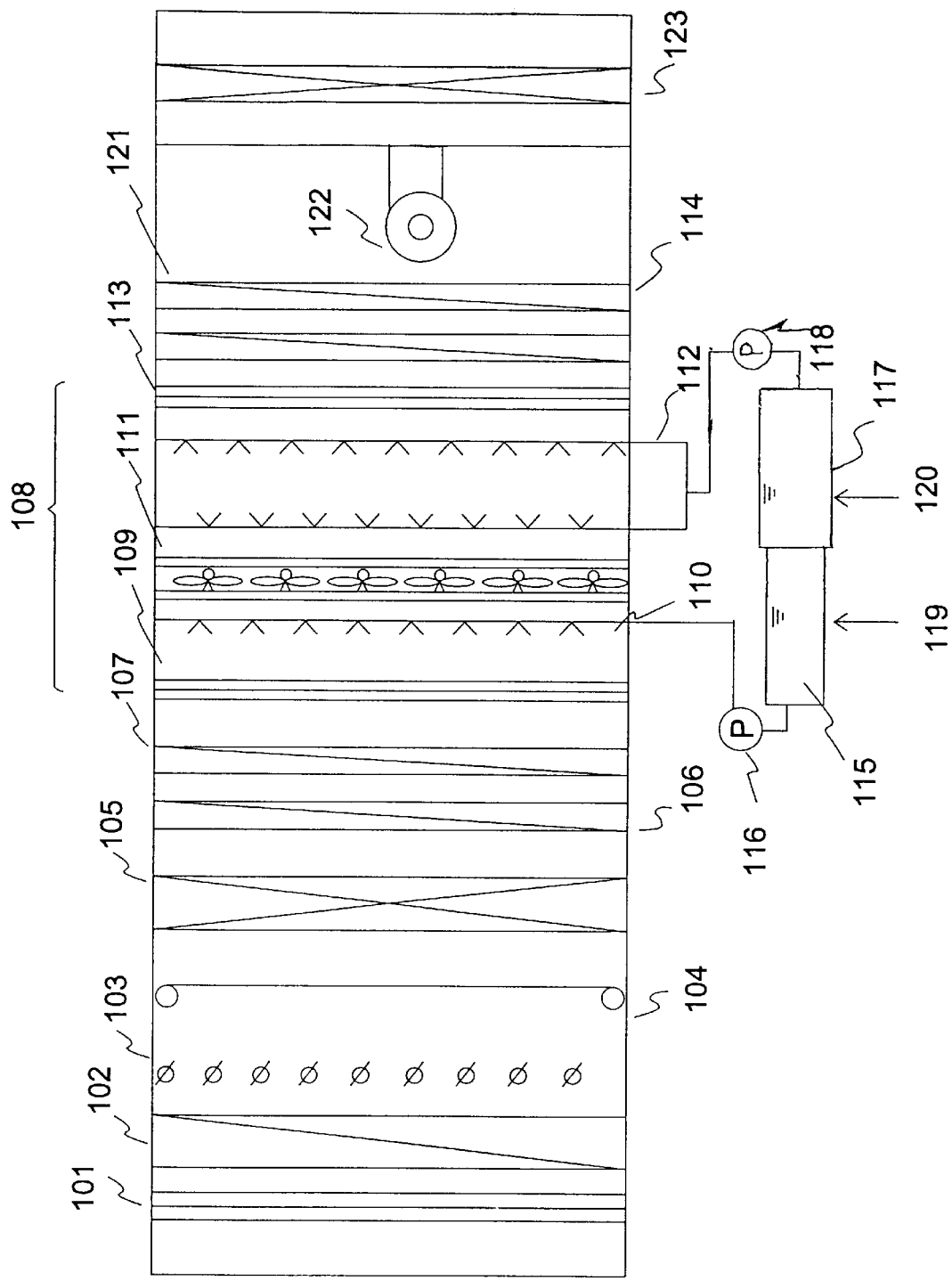
FIG. 2 is an overall view of an air conditioning unit containing a gaseous molecule impurity removing system of a first embodiment of the present invention.

FIG. 2 is an overall view of an external air conditioning unit for a clean room, containing a gaseous molecule impurity removing apparatus of a first embodiment of the present invention. From an upstream side, there are arranged a pre-filter 101, a preheating coil 102, a chuck damper 103, a roll filter 104, a medium efficiency filter 105, a heating coil 106, a cooling coil 107, a gaseous molecule impurity removing apparatus 108, a re-heating coil 121, a fan 122 and a HEPA filter 123.

The gaseous molecule impurity removing apparatus 108 of this embodiment consists of an eliminator A 109, a pre-nozzle 110, an eliminator B 111, a post-nozzle 112, an eliminator C 113, and a cooling coil 114. Pure water or the like can be supplied to the pre-nozzle 110 by a pre-circulating tank 115 and a pre-circulating pump 116. Pure water can be supplied to the post-nozzle 112 by a post-circulating tank 117 and a post-circulating pump 118.

The direction of a pure water shower from the pre-nozzle 110 is arranged so as to be opposite to the direction of external air introduced from an upstream side. The direction of a pure water shower from the post-nozzle 112 is opposite to an upstream direction of a previous stage nozzle and parallel to a downstream direction of a subsequent stage nozzle, and these nozzles are arranged together as a pair of nozzles. This pair of nozzles are alternately arranged so that the nozzle directions are not opposite to each other. A windmill type fan capable of effectively removing internal water droplets is built into the eliminator B 111. This makes it possible to supply respective makeup water A 119 and makeup water B 120 to the pre-circulating tank 115 and the post-circulating tank 117. Pure water ejected from the pre-nozzle 110 is collected in the pre-circulating tank 115 arranged directly below, and water droplets attached to the eliminator A 109, the eliminator B 111 and the eliminator C 113 are also collected in the pre-circulating tanks 115 and the post-circulating tank 117 directly underneath.

As described above, according to the first embodiment, the post-nozzle of the gaseous molecule impurity removing apparatus is a 2-stage device, with the first stage jet nozzle arranged facing an upstream side and the second stage jet nozzle facing a downstream side, which means that the vapor-liquid contact area is enlarged and the gaseous molecule impurity removal efficiency is improved. Also, because the windmill type fan is built into the eliminator B 31, water droplets are effectively removed by the centrifugal force of the fan.

(SECOND EMBODIMENT)

Figure 3:
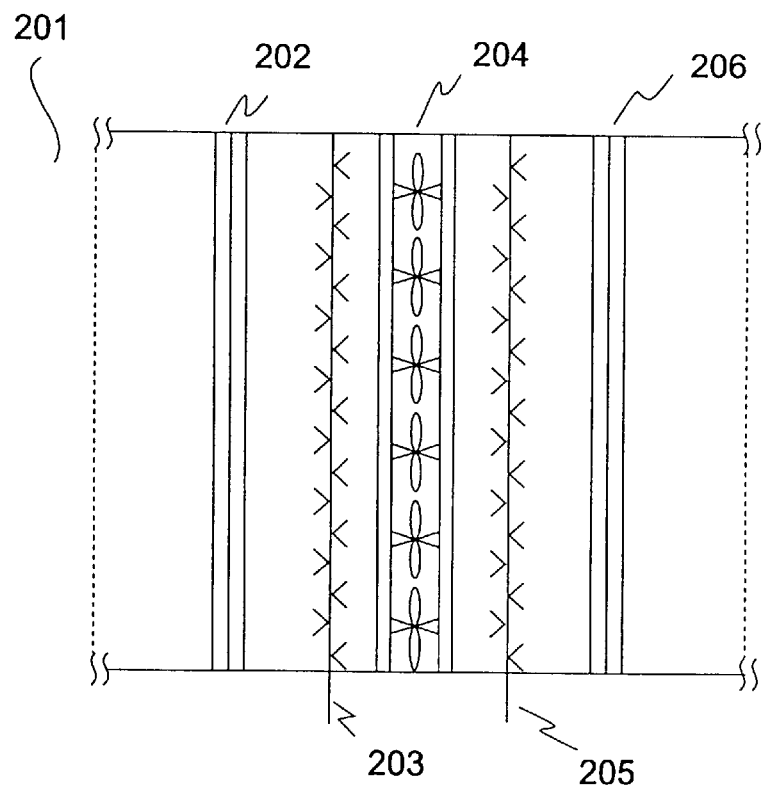
FIG. 3 shows a gaseous molecule impurity removing system of a second embodiment of the present invention.

FIG. 3 shows a gaseous molecule impurity removing apparatus 201 of a second embodiment of the present invention. The gaseous molecule impurity removing apparatus consists of, sequentially from the upstream side, an eliminator A 202, a pre-nozzle 203, an eliminator B 204, a post-nozzle 205, and an eliminator C 206. The pre-nozzle 203 and the post-nozzle 205 are formed as a pair of opposed jet nozzles. An upstream side nozzle faces the downstream side, while a downstream side nozzle faces the upstream side.

As described above, since the nozzle section of the second embodiment is formed of a counterflow jet nozzle and a parallel jet nozzle, gaseous molecule impurity and vapor-liquid contact efficiency is increased and the gaseous molecule impurity removal efficiency is improved. Also, by making the nozzle pitch small it is possible to still further improve the gaseous molecule impurity absorption efficiency.

(THIRD EMBODIMENT)

Figure 4:
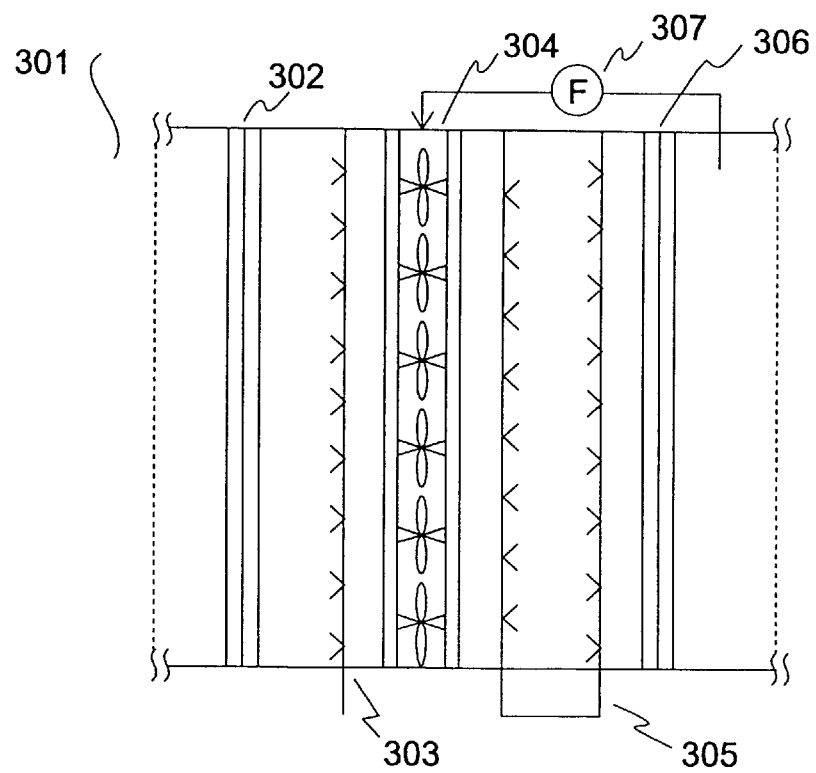
FIG. 4 shows a gaseous molecule impurity removing system of a third embodiment of the present invention.

FIG. 4 shows a gaseous molecule impurity removing apparatus 301 of a third embodiment of the present invention. The gaseous molecule impurity removing apparatus 301 consists of, sequentially from the upstream side, an eliminator A 302, a pre-nozzle 303, an eliminator B 304, a post-nozzle 305, and an eliminator C 306, with a screw fan 307 for blasting air being attached to the central eliminator B 304. At this time, blasted air can be cooled by a heat exchanger.

According to the above described second embodiment, air that has been processed once is fed back to the gaseous molecule impurity removing apparatus, which improves the gaseous molecule impurity removal efficiency. Also, since air is fed back to the central eliminator of the three stage eliminator, it is possible to prevent water droplets scattering to the upstream side and the downstream side.

As has been described above, with the gaseous molecule impurity removing apparatus of the present invention, the nozzle section has a pair of jet nozzles, with one jet nozzle facing upstream and the other nozzle facing downstream. This means that the gaseous molecule impurity and vapor-liquid contact efficiency are increased and the gaseous molecule impurity removal efficiency is improved. Also, if a three stage eliminator is provided and a windmill type fan is included in the central eliminator, water droplets are prevented from scattering and it is possible to improve the gaseous molecule impurity removal efficiency.

Therefore, since the present invention provides a gaseous molecule impurity removal apparatus with a simple structure, as described above, it is possible to reduce the space occupied by the gaseous molecule impurity removal apparatus and it is also possible to curtail running costs still further.

What is claimed is:

1. An apparatus for removing gaseous molecule impurities from external air, comprising an eliminator, the eliminator having an air fan.

2. An apparatus for removing water-soluble, gaseous molecule impurities from external air, comprising an eliminator, the eliminator having an air fan.

3. An apparatus for removing gaseous molecule impurities from external air comprising three successive eliminator stages, a middle one of the three eliminator stages having an air fan that circulates air downstream of the three eliminator stages towards the middle eliminator stage.

4. The apparatus for removing gaseous molecule impurities of claim 3, including means for removing water-soluble, gaseous molecule impurities from the external air.

5. The apparatus of claim 3, further comprising heat exchanger means downstream of the air fan, for cooling the downstream air being circulated toward the middle eliminator stage.

6. The apparatus of claim 1, further comprising heat exchanger means for cooling the external air.

* * * * *